(12) United States Patent
Heinemann et al.

(10) Patent No.: US 11,686,568 B2
(45) Date of Patent: Jun. 27, 2023

(54) SCANNING ELEMENT AND INDUCTIVE POSITION MEASURING DEVICE HAVING A SCANNING ELEMENT

(71) Applicant: DR. JOHANNES HEIDENHAIN GmbH, Traunreut (DE)

(72) Inventors: Christoph Heinemann, Übersee (DE); Martin Heumann, Traunstein (DE); Marc Oliver Tiemann, Waging am See (DE)

(73) Assignee: DR. JOHANNES HEIDENHAIN GmbH, Traunreut (DE)

( * ) Notice: Subject to any disclaimer, the term of this patent is extended or adjusted under 35 U.S.C. 154(b) by 62 days.

(21) Appl. No.: 17/545,167

(22) Filed: Dec. 8, 2021

(65) Prior Publication Data
US 2022/0178672 A1 Jun. 9, 2022

(30) Foreign Application Priority Data
Dec. 8, 2020 (EP) .................................... 20212349

(51) Int. Cl.
*G01B 7/00* (2006.01)
*G01B 7/30* (2006.01)
*G01D 5/20* (2006.01)

(52) U.S. Cl.
CPC ............... *G01B 7/003* (2013.01); *G01B 7/30* (2013.01); *G01D 5/2053* (2013.01)

(58) Field of Classification Search
CPC .......... G01D 5/20; G01D 5/2053; G01B 7/30; G01B 7/003
See application file for complete search history.

(56) References Cited

U.S. PATENT DOCUMENTS

| 6,611,138 | B2 | 8/2003 | Vasiloiu |
| 10,866,121 | B2 | 12/2020 | Utermoehlen et al. |
| 2017/0276518 | A1* | 9/2017 | Kimata ............... G01D 5/2073 |
| 2021/0341278 | A1* | 11/2021 | Tiemann ............. G01D 5/2053 |
| 2022/0065610 | A1* | 3/2022 | Heinemann .............. G01D 5/20 |
| 2022/0178673 | A1* | 6/2022 | Heinemann .............. G01D 5/20 |
| 2022/0178721 | A1* | 6/2022 | Heumann ............. G01D 5/2053 |

FOREIGN PATENT DOCUMENTS

| DE | 602004006168 T2 | 1/2008 |
| DE | 102016202859 B3 | 6/2017 |
| EP | 1164358 A1 | 12/2001 |
| JP | 2006208239 A | 8/2006 |
| WO | 2004/020936 A2 | 3/2004 |

* cited by examiner

*Primary Examiner* — Jermele M Hollington
*Assistant Examiner* — Suresh K Rajaputra
(74) *Attorney, Agent, or Firm* — Carter, DeLuca & Farrell LLP

(57) ABSTRACT

A scanning element includes a multi-layer circuit board and electronic components, and the circuit board includes a first detector unit having a first receiver track. Moreover, the circuit board includes a second detector unit having a second receiver track. The circuit board has a geometrical center plane located between the detector units. The receiver tracks include first and second receiver conductor traces, each having a periodic characteristic, and the first receiver track has a first gap along its extension, which is restricted by the first receiver conductor traces. The second receiver track has a second gap, which is restricted by the second receiver conductor traces. The circuit board has a plated through-hole arranged both within the first gap and within the second gap.

19 Claims, 6 Drawing Sheets

SCANNING ELEMENT AND INDUCTIVE POSITION MEASURING DEVICE HAVING A SCANNING ELEMENT

CROSS-REFERENCE TO RELATED APPLICATIONS

The present application claims priority to Application No. 20212349.3, filed in the European Patent Office on Dec. 8, 2020, which is expressly incorporated herein in its entirety by reference thereto.

FIELD OF THE INVENTION

The present invention relates to a scanning element, e.g., for an inductive position measuring device for detecting a position of the scanning element relative to two scale elements that are rotatable at different speeds, and to a position measuring device having such a scanning element.

BACKGROUND INFORMATION

Inductive position measuring devices, for example, are used as angle encoders for determining the angular position of machine parts that are rotatable relative to one another. In inductive position measuring devices, excitation tracks and receiver tracks, such as in the form of conductor traces, are often mounted on a shared, usually multi-layer circuit board, which is firmly connected to a stator of an angle encoder, for example. Arranged opposite this circuit board is a scale element on which graduation structures are provided and which is connected to the rotor of the angle encoder in a torsionally fixed manner. When an electrical excitation current that varies over time is applied to the excitation tracks, signals that are a function of the angular position are generated in the receiver coils during the relative rotation between rotor and stator. These signals are then further processed in an evaluation electronics.

Inductive position measuring devices are frequently used especially in drives of robots as measuring devices for determining the angular position of a drive shaft and simultaneously for the exact determination of the angular position of an output shaft, the movement of the drive shaft being initiated into the output shaft by a reduction gear. In this instance, angular positions or angular settings are measured with the aid of a scanning element which has a circuit board that is provided with corresponding detector units on both sides, so that the respective angular position of scale elements situated in a rotatable manner on both sides of the circuit board is able to be determined.

BACKGROUND INFORMATION

Japanese Patent Document No. 2006-208239, for example, in FIG. 6, describes a position measuring device that has two rotors between which a stator is arranged. The position measuring device is used in a micrometer screw, for example

SUMMARY

Example embodiments of the present invention provide a scanning element for an inductive position measuring device, which operates relatively accurately, is compact, can be produced in an economical manner, and provides for the determination of positions or angular positions of two scale elements.

The scanning element, which is configured and intended for an inductive position measuring device, includes a multi-layer circuit board provided with a first detector unit, a second detector unit, and electronic components. The first detector unit has a first excitation track and a first receiver track and is arranged in a first layer and in a second layer of the circuit board. The second detector unit has a second excitation track and a second receiver track and is arranged in a third layer and in a fourth layer of the circuit board. The circuit board has a geometrical center plane, which is located between the detector units, the first receiver track and the second receiver track being arranged circumferentially about an axis in the circumferential direction. The first receiver track includes first receiver conductor traces, and the second receiver track includes second receiver conductor traces. These receiver conductor traces have a periodic characteristic in each case. Along its extension in the circumferential direction, the first receiver track has a first gap which is restricted by the first receiver conductor traces in the circumferential direction. The second receiver track has a second gap along its extension in the circumferential direction, which is restricted by the second receiver conductor traces in the circumferential direction. The circuit board has a plated through-hole, which is arranged both within the first gap and within the second gap. For example, the plated through-hole is therefore arranged between the first receiver conductor traces and the second receiver conductor traces in relation to the circumferential direction.

First direction x, for example, represents the particular direction in which the desired position is measured (measuring direction). Since the position measuring device is meant to measure a first relative angular position between the first scale element and the scanning element in relation to a rotary or pivot movement about an axis (of rotation), and at the same time a second angular position between the second scale element and the scanning element, the first direction x is a circumferential direction or a tangential direction.

In addition, a second direction y, for example, has an orthogonal extension with respect to first direction x.

A third direction z, for example, has an orthogonal orientation with respect to first direction x and simultaneously an orthogonal orientation with respect to second direction y. Third direction z extends parallel to the axis (of rotation) about which a scale element is rotatable relative to the scanning element. In addition, third direction z has an orthogonal alignment to the center plane. The individual layers of the circuit board are located at an offset from one another in third direction z.

For example, an end, e.g., a contact point of the plated through-hole, may be arranged within the first gap, and the other end, or the other contact point, may be arranged within the second gap. The plated through-hole may, for example, extend in third direction z.

The two largest surfaces of a circuit board are usually oriented in parallel with one another. For example, the center plane is located in the center between these circuit board surfaces, in parallel with the surfaces, so that the distance between a surface of the circuit board to the center plane, e.g., in third direction z, is of exactly the same size as the distance between the other surface of the circuit board to the center plane.

The first excitation track and the second excitation track may extend along the circumferential direction or along first direction x.

The first receiver track and the second receiver track may extend along the circumferential direction or along first direction x, just like the first excitation track and the second excitation track.

For example, the scanning element is arranged such that the first excitation track and the second excitation track are electrically connected in series.

The first excitation track and the second excitation track are able to be energized by an excitation current, which usually has a current intensity that varies over time (alternating current or mixed current). The excitation current can be generated with the aid of the electronic components, which means that its characteristic is able to be formed by the electronic components. Since a physical relationship exists between the current intensity and the voltage intensity, the same view may also be taken for the excitation voltage.

The particular signals that are able to be generated by the first receiver track and the second receiver track may be further processed with the aid of the electronic components, which, for example, form an evaluation circuit.

The electronic components may thus be components of different electronic circuits or be assigned to different circuits. For example, certain electronic components may be components of the circuit for generating an excitation current, or additional electronic components may be components of another circuit for evaluating or further processing signals.

The circuit board may be arranged such that the plated through-hole electrically connects the first detector unit to the third layer or to the fourth layer. Alternatively, the plated through-hole may electrically connect the second detector unit to the first layer or to the second layer. For example, the plated through-hole is able to be connected to a conductor trace which is correspondingly arranged in the first, second, third, or fourth layer.

The plated through-hole may be in electrical contact with one of the electronic components so that signals that are generated by the first detector unit or by the second detector unit or their receiver conductor traces are able to be conveyed to the electronic component via the plated through-hole.

The plated through-hole may be arranged as a through-hole via. More specifically, the plated through-hole is created by a continuous bore through the circuit board. The bore is, for example, provided with a metal layer on the inner wall, e.g., a copper layer. The upper and lower contact points of the plated through-hole form an electrical contact with the conductor traces, conductor layers, or electronic components. A plated through-hole also refers to a system in which multiple bores or cavities, which are filled or coated with a conductive material, are arranged at an offset from one another (e.g., in a radial direction or circumferential direction). Such plated through-holes are often also referred to as staggered vias.

The first gap may extend across a first length in the circumferential direction, the first receiver conductor traces having a periodic characteristic featuring a first period length $\lambda 1$. The first length is greater than or equal to ⅛ the first period length $\lambda 1$, e.g., $L1 \geq \frac{1}{8} \cdot \lambda 1$, L1 representing the first period length.

The scanning element may be arranged so that the second gap extends across a second length in the circumferential direction and the second receiver conductor traces have a periodic characteristic featuring a second period length $\lambda 2$. In this instance, the second length is greater than or equal to ⅛ the second period length $\lambda 2$, e.g., $L2 \geq \frac{1}{8} \cdot \lambda 2$, L2 representing the second period length.

The first receiver conductor traces may have a periodic characteristic featuring a first period length $\lambda 1$, and the second receiver conductor traces have a periodic characteristic featuring a second period length $\lambda 2$. Second period length $\lambda 2$ is greater than or equal to the first period length $\lambda 1$ ($\lambda 2 \geq \lambda 1$), for example.

The second detector unit and at least one of the electronic components may be arranged on the same side of the circuit board. In this configuration, the second detector unit and the electronic component are therefore arranged at an offset in the same direction with respect to the center plane so that the center plane is not arranged between the second detector unit and the electronic component.

The first detector unit may have a third receiver track, and the second detector unit may have a fourth receiver track. For example, the third receiver track encompasses third receiver conductor traces, the third receiver conductor traces having a periodic characteristic and the period length of the third receiver conductor traces being smaller than the first period length $\lambda 1$ of the first receiver conductor traces. In addition, the fourth receiver track may include fourth receiver conductor traces, which have a periodic characteristic, the period length of the fourth receiver conductor traces being greater than the second period length $\lambda 2$ of the second receiver conductor traces.

The first detector unit may have a third excitation track, and the second detector unit may have a fourth excitation track.

A first shielding layer may be arranged in a fifth layer, and a second shielding layer may be arranged in a sixth layer of the circuit board, the plated through-hole penetrating the first shielding layer and the second shielding layer, e.g., without electrically contacting the shielding layers. The center plane is located between the first shielding layer and the second shielding layer so that the shielding layers are arranged on both sides of the center plane.

In relation to third direction z, the center plane is located between the first detector unit and the first shielding layer. Therefore, the center plane is located between the second detector unit and the second shielding layer in relation to third direction z, and the second detector unit and the second shielding layer are arranged on both sides of the center plane.

According to an example embodiment of the present invention, an inductive position measuring device includes a scanning element, as, for example, described above, a first scale element, and a second scale element. The scale elements are arranged on both sides of the circuit board spaced apart in third direction z (orthogonal to the center plane).

For example, the first scale element has a first diameter D1, and the second scale element has a second diameter d2, first diameter D1 being greater than second diameter d2 (e.g., D1>d2).

In addition, the scale elements may be arranged so as to be rotatable about a common axis relative to the scanning element.

Moreover, at least one of the electronic components may be located at a greater distance from the axis than the outer contour of the second scale element. Thus, the at least one electronic component is located radially outside the second scale element.

Further features and aspects of example embodiments of the present invention are described in more detail below with reference to the appended schematic Figures.

DETAILED DESCRIPTION

Figure 1:
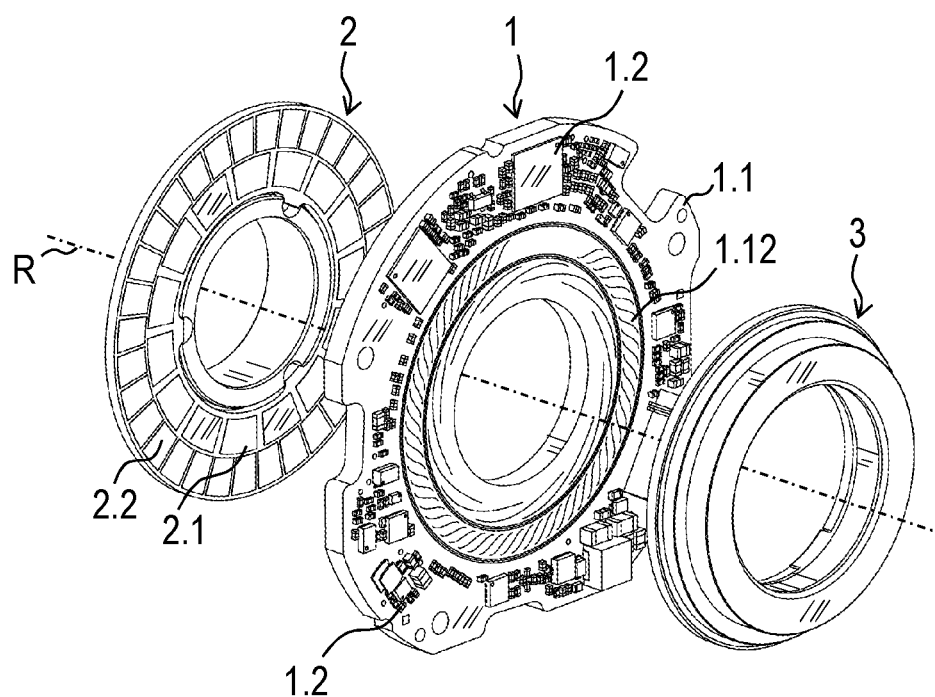
FIG. 1 is a perspective view of a position measuring device including a scanning element, a first scale element, and a second scale element.

Example embodiments of the present invention are described with reference to FIG. 1 based on a position measuring device provided with a scanning element 1, which is able to be used both for acquiring an angular position of a first scale element 2 and an angular position of a second scale element 3. Both scale elements 2, 3 are arranged so as to be rotatable about an axis R relative to scanning element 1. Such a position measuring device may be used in a drive device of a robot, for example. Second scale element 3, for example, is connected to a drive shaft of a motor in a torsionally fixed manner. The drive shaft in turn is connected to a reduction gear that has an output shaft. First scale element 2 rotates with this output shaft. In this manner, an angular position for a commutation of the motor, for example, is able to be performed with the aid of second scale element 3 and, by comparison, a highly precise angular position for positioning the robot is able to be achieved with the aid of first scale element 2.

Scanning element 1 includes a circuit board 1.1, which has multiple layers, and also electronic components 1.2, which are mounted on circuit board 1.1. Scanning element 1 is used for scanning first scale element 2 and simultaneously for scanning second scale element 3. In the illustrated example embodiment, electronic components 1.2 are mounted only on the second side. As an alternative or in addition, however, the first side of circuit board 1.1 may also be fitted with electronic components.

A first detector unit 1.11 is arranged on a first side of circuit board 1.1 in order to determine the angle information, and a second detector unit 1.12 is arranged on a second side of circuit board 1.1. FIG. 1 illustrates only the particular structures of second detector unit 1.12 that are arranged on an outer fourth layer F (see, e.g., FIGS. 6 and 7).

Figure 2:
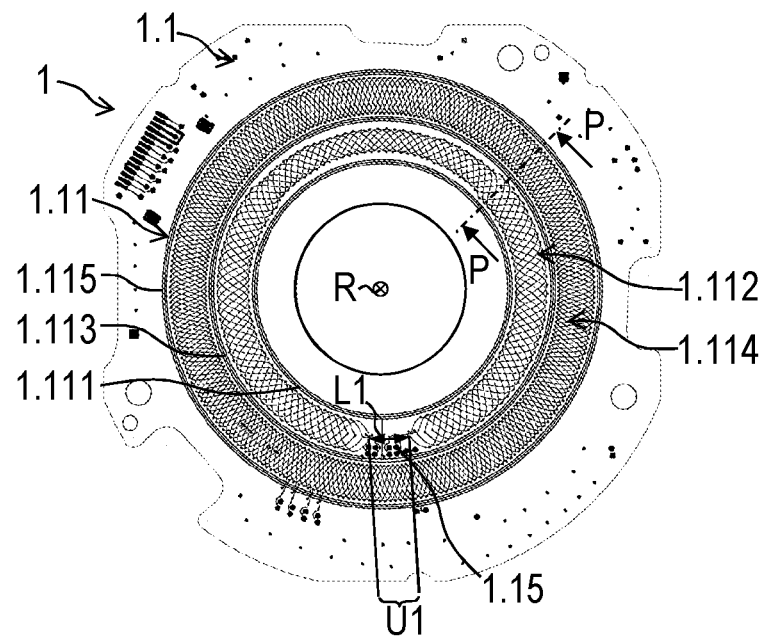
FIG. 2 is a top view of a first side of the scanning element.
Figure 3:
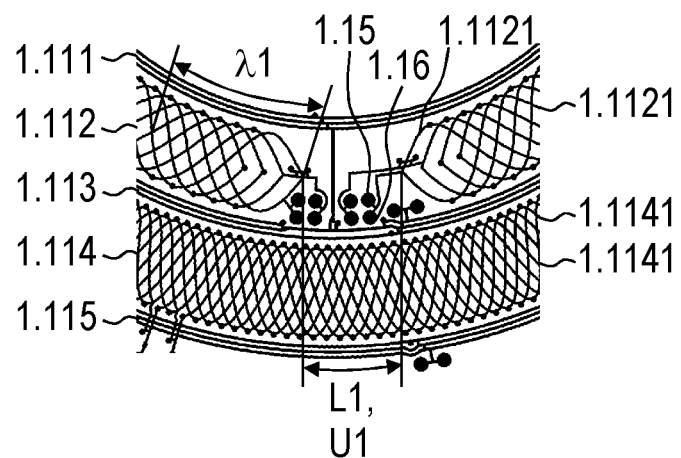
FIG. 3 is an enlarged view of the first side of the scanning element.

FIGS. 2 and 3 (FIG. 3, for example, illustrating an enlarged view of first detector unit 1.11 illustrated in FIG. 2) illustrate the particular structures of first detector unit 1.11 that are arranged in an outer first layer A of circuit board 1.1 and in a second layer B of circuit board 1.1. First detector unit 1.11 includes a first excitation track 1.111, a first receiver track 1.112, a third excitation track 1.113, a third receiver track 1.114, and a fifth excitation track 1.115. First receiver track 1.112 includes first receiver conductor traces 1.1121.

Figure 4:
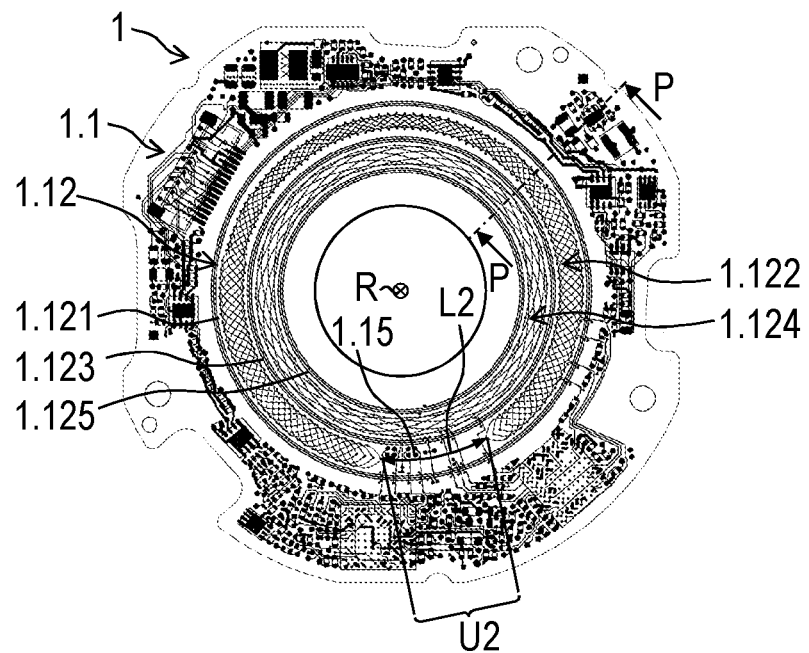
FIG. 4 is a top view of a second side of the scanning element.
Figure 5:
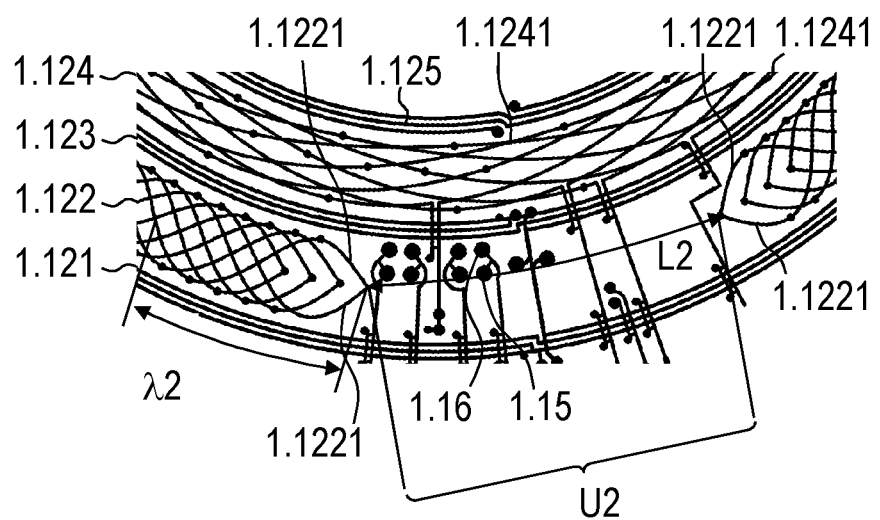
FIG. 5 is an enlarged view of the second side of the scanning element.

FIGS. 4 and 5 illustrate circuit board 1.1 from the other side so that second detector unit 1.12 can be seen. FIG. 5 is an enlarged view of second detector unit 1.12. FIGS. 4 and 5, for example, illustrate the particular structures of second detector unit 1.12 that are arranged in the outer fourth layer F of circuit board 1.1 and in a third layer E of circuit board 1.1. Second detector unit 1.12 includes a second excitation track 1.121, a second receiver track 1.122, a fourth excitation track 1.123, a fourth receiver track 1.124, and a sixth excitation track 1.125. Second receiver track 1.122 includes second receiver conductor traces 1.1221.

Figure 6:
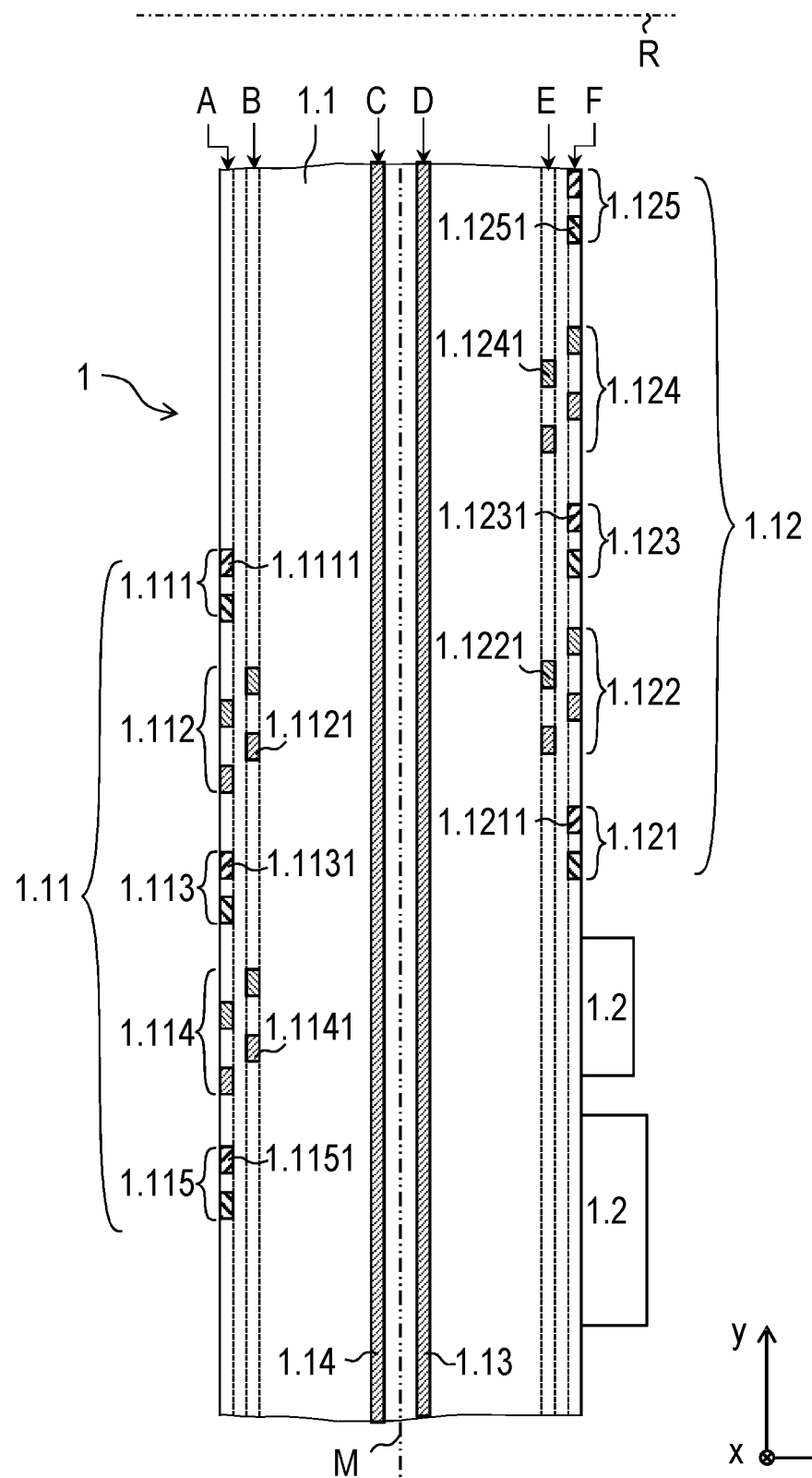
FIG. 6 is an enlarged, cross-sectional view of the scanning element taken along the line P-P.

FIG. 6 is an enlarged, partial cross-sectional view taken along sectional line P-P through scanning element 1 or circuit board 1.1. Cross-hatching of electrically insulating material of circuit board 1.1 is omitted for clarity. Moreover, it should be understood that FIG. 6 is not drawn true to scale for a better understanding of scanning element 1. Circuit board 1.1, as previously mentioned, includes multiple layers. From a geometrical standpoint, a center plane M is able to be defined for circuit board 1.1, which is located centrically between the first and second side in parallel with the first side and in parallel with the second side of circuit board 1.1. In addition, the geometrical relationships of the individual elements relative to one another are able to be defined with the aid of a coordinate system. A first direction x is the particular direction along which an intended position or angle measurement is to be performed. In the illustrated example embodiment, first direction x corresponds to the circumferential direction. Axis R about which scale elements 2, 3 are rotatable extends in parallel with a third direction z so that third direction z may also be defined as the axial direction. A second direction y, which may also be denoted as the radial direction, has an orthogonal orientation with respect to third direction z and first direction x. Thus, a plane that is defined by the x and y axis is oriented parallel to center plane M, and third direction z and also axis R have an orthogonal extension with respect to center plane M.

Arranged in first layer A of circuit board 1.1 and in second layer B of circuit board 1.1 is first detector unit 1.11, while second detector unit 1.12 is arranged in third layer E and in fourth layer F. First layer A is arranged closest to the first side of circuit board 1.1, and second layer B is arranged second-closest to the first side of circuit board 1.1. The same applies to fourth layer F and third layer E with regard to the second side of circuit board 1.1.

Excitation tracks 1.111, 1.113, 1.115 of first detector unit 1.11 include excitation conductor traces 1.1111, 1.1131, 1.1151, which extend in first layer A. In a similar manner, excitation tracks 1.121, 1.123, 1.125 of second detector unit 1.12 include excitation conductor traces 1.1211, 1.1231, 1.1251 which extend in fourth layer F.

In addition, circuit board 1.1 also includes a fifth layer D and a sixth layer C. Arranged in fifth layer D is a first shielding layer 1.13, and a second shielding layer 1.14 is arranged in sixth layer C. Shielding layers 1.13, 1.14 are arranged, for example, as copper layers that have a relatively large surface.

Excitation tracks 1.111, 1.113, 1.115 of first detector unit 1.11 enclose first excitation track 1.112 and/or third excitation track 1.114.

Excitation tracks 1.121, 1.123, 1.125 of second detector unit 1.12 enclose second receiver track 1.122 and/or fourth receiver track 1.124. Both excitation tracks 1.111, 1.113, 1.115, 1.121, 1.123, 1.125 and receiver tracks 1.112, 1.114, 1.122, 1.124 extend along the circumferential direction or along first direction x.

In the illustrated example embodiment, each one of receiver tracks 1.112, 1.114, 1.122, 1.124 includes receiver conductor traces 1.1121, 1.1141, 1.1221, 1.1241, which are located at an offset in the circumferential direction so that they are able to supply four signals that are phase-shifted according to the offset. In the Figures, the particular receiver conductor traces 1.1121, 1.1141, 1.1221, 1.1241 that belong to one and the same receiver track 1.112, 1.114, 1.122, 1.124 are provided with only a single reference numeral. As a result, all receiver conductor traces 1.1121 of first receiver track 1.112 are given only one reference numeral. Moreover, first receiver conductor traces 1.1121 of first detector unit 1.11, connected to vias, extend in different layers of circuit board 1.1. so that undesired short circuits at the junction points are avoided. The same also applies to receiver conductor traces 1.1221, 1.1241 of second detector unit 1.12. Although, strictly speaking, each one of the first and second receiver conductor traces 1.1121, 1.1221 includes many conductor sections which are distributed to two planes or layers and situated next to one another, such a structure is denoted overall as one receiver conductor trace 1.1221, 1.1241.

Receiver conductor traces 1.1121, 1.1141, 1.1221, 1.1241 have a spatially periodic characteristic, which has a substantially sinusoidal or sine-type configuration. Receiver conductor traces 1.1121 of first receiver track 1.112 have a period length λ1 (FIG. 3), while receiver conductor traces 1.1221 of second receiver track 1.122 have a period length λ2 (see, e.g., FIG. 5). In the illustrated example embodiment, receiver conductor traces 1.1121, 1.1141, 1.1221, 1.1241 that are adjacent in a receiver track 1.112, 1.114, 1.122, 1.124 are arranged at an offset from one another of ⅛ the full sine period (by λ/4 or 45° along the circumferential direction or first direction x). Receiver conductor traces 1.1121, 1.1141, 1.1221, 1.1241 are electrically connected so that they supply 0° and 90° signals on the one hand and 45° and 135° signals on the other hand. From the 0° and 90° signals, a first position signal is able to be determined, and from the 45° and 135° signals, a redundant second signal with regard to the first position signal is able to be determined.

In the illustrated example embodiment, second period length λ2 is greater than first period length λ1.

As illustrated in FIGS. 2 and 3, first receiver track 1.112 has a first gap U1 along its extension in the circumferential direction (e.g., x direction). First receiver conductor traces 1.1121 restrict the region of first gap U1, which means that no detector structure is located between the restricting receiver conductor traces 1.1121. In a first approximation, first gap U1 thus is a region that is a ring sector from a geometrical point of view. Minimal distance L1 in the circumferential direction between two first receiver conductor traces 1.1121 in the region of first gap U1 amounts to ⅝·λ1 (U1=⅝·1) in the illustrated example embodiment. Thus, no periodically extending first receiver conductor traces 1.1121 are located in the region of first gap U1.

According to FIGS. 4 and 5, second receiver track 1.122 has a second gap U2 along its extension in the circumferential direction. This second gap U2 is restricted by second receiver conductor traces 1.1221. The minimal distance L2 in the circumferential direction between two second receiver conductor traces 1.1221 in the region of second gap U2 thus amounts to 13/8 (U1=13/8·λ1) in the illustrated example embodiment. Thus, no periodically extending second receiver conductor traces 1.1221 are located in second gap U2.

Figure 7:
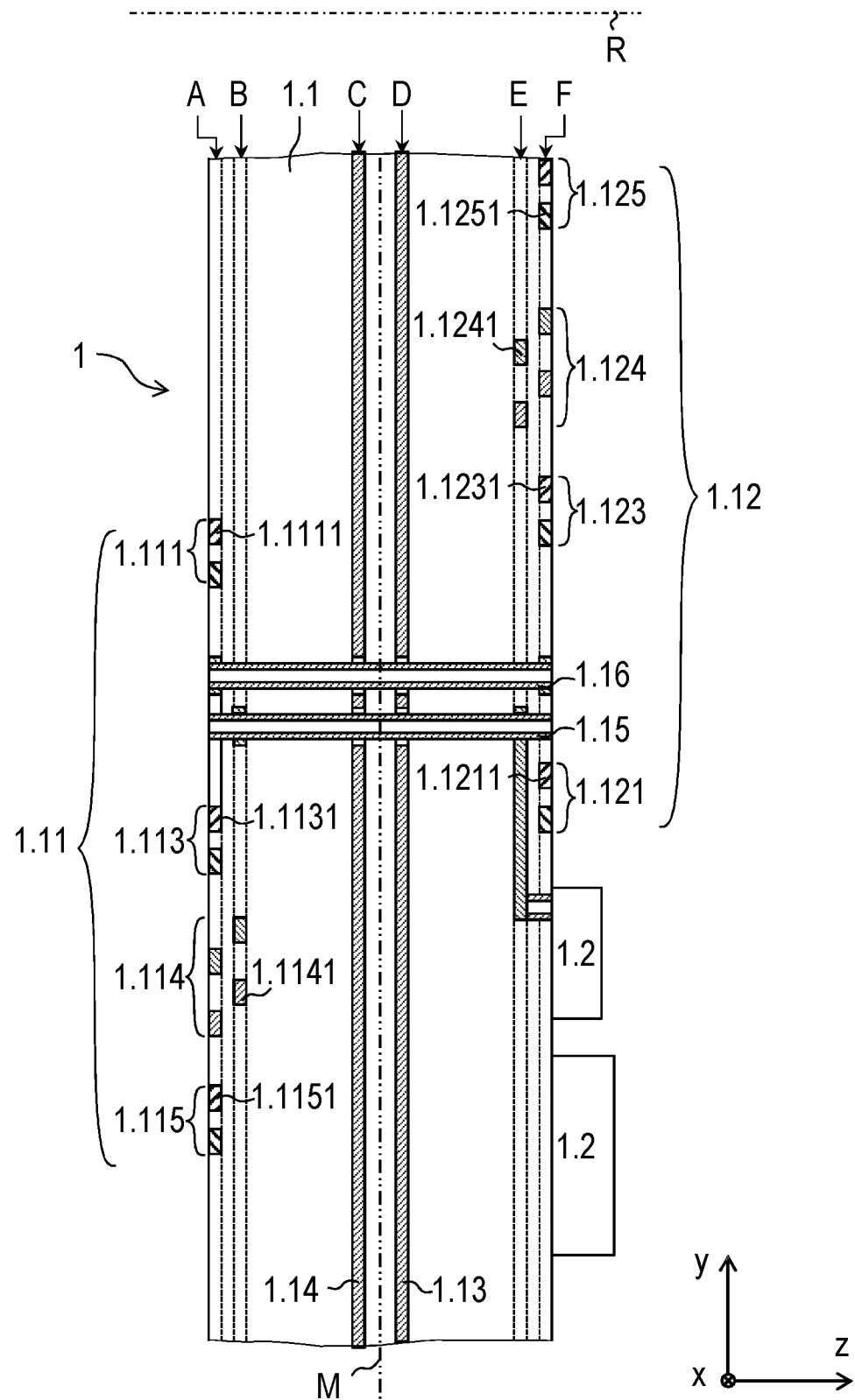
FIG. 7 is an enlarged, cross-sectional view of the scanning element in the region of a plated through-hole.

Moreover, circuit board 1.1 has plated through-holes 1.15, 1.16. FIG. 7 is a schematic, partial cross-sectional view through scanning element 1 or through circuit board 1.1 in the region of plated through-holes 1.15, 1.16. Plated through-holes 1.15, 1.16 are arranged as a through-hole via and thus penetrate circuit board 1.1 across its entire thickness. Plated through-holes 1.15, 1.16 thus extend in parallel with third direction. Circuit board 1.1 therefore is configured such that plated through-holes 1.15, 1.16 are arranged both within first gap U1 and within second gap U2.

With the aid of a plated through-hole 1.15, first receiver conductor traces 1.1121 of first receiver track 1.112 are electrically connected to an electronic component 1.2 that is located beyond center plane M. For this purpose, via a conductor trace that extends in second layer B, an electrical contact is established to plated-through hole 1.15 with a first receiver conductor trace 1.1121. Plated through-hole 1.15 penetrates first shielding layer 1.13 and second shielding layer 1.14, shielding layers 1.13, 1.14 being structured such that they are not electrically connected to plated through-hole 1.15. In third layer E, a contact is established to a circuit trace that extends in this layer E. This circuit trace is electrically connected to a further via, which is a blind via or a micro via, by which the contact to electronic component 1.2 is ultimately established.

Further plated through-hole 1.16 connects first receiver conductor traces 1.1121 extending in first layer A to fourth layer F. Via circuit traces, an electrical contact to electronic component 1.2 is established.

First receiver track 1.112 is arranged so as to overlap with regard to second receiver track 1.122 in second direction y.

Figure 8:
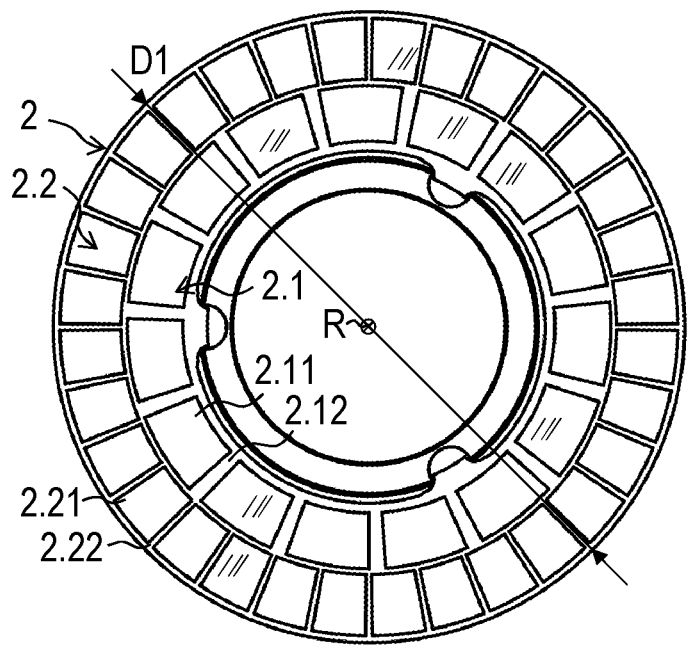
FIG. 8 is a top view of a first scale element.
Figure 9:
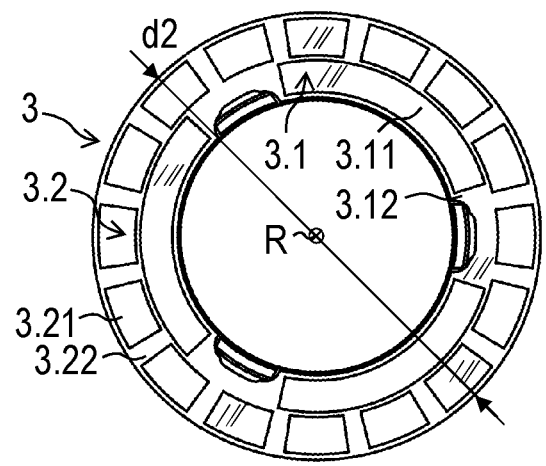
FIG. 9 is a top view of a second scale element.

FIG. 8 is a top view of first scale element 2. Second scale element 3 is likewise illustrated in a top view in FIG. 9. Scale elements 2, 3 have a disk-shaped configuration, and first scale element 2 has a first diameter D1 and second scale element 3 has a second diameter d2. First diameter D1 is greater than second diameter d2 (e.g., D1>d2).

Scale elements 2, 3 in the illustrated example embodiment are made from a substrate that is produced from an epoxy resin and on which two graduation tracks 2.1, 2.2; 3.1, 3.2 are provided in each case. Graduation tracks 2.1, 2.2; 3.1, 3.2 have an annular configuration and are arranged on the substrate concentrically with respect to axis R and with different diameters. Graduation tracks 2.1, 2.2; 3.1, 3.2 include graduation structures that have a periodic sequence of alternatingly arranged electrically conductive graduation regions 2.11, 2.21; 3.11, 3.21 and non-conductive graduation regions 2.12, 2.22; 3.12, 3.22. In the illustrated example embodiment, copper is applied to the substrate as the material for the electrically conductive subregions 2.11, 2.21; 3.11, 3.21. In contrast, no coating is applied to the substrate in the non-conductive graduation regions 2.12, 2.22; 3.12, 3.22. Because of the arrangement featuring two graduation tracks 2.1, 2.2; 3.1, 3.2 in each case, the angular positions of scale elements 2, 3 are able to be determined in absolute terms. Outermost graduation track 2.2 of first scale element 2 has the largest number of graduation regions 2.21, 2.22 along a circumferential line, so that the greatest resolution with regard to the measurement of the angular position is achievable with its aid.

In the assembled state according to FIG. 1, scanning element 1 and scale elements 2, 3 are located opposite each other with an axial clearance or an air gap, so that in a relative rotation between scale elements 2, 3 and scanning element 1, a signal that is a function of the of the respective angular position is able to be generated in receiver conductor traces 1.1121, 1.1141, 1.1221, 1.1241 with the aid of induction effects. A precondition for the generation of corresponding signals is that excitation conductor traces 1.1111, 1.1131, 1.1151, 1.1211, 1.1231, 1.1251 generate an electromagnetic excitation field that is variable in time in the region of the graduation structures scanned in each case. In the illustrated example embodiment, excitation conductor traces 1.1111, 1.1131, 1.1151, 1.1211, 1.1231, 1.1251 are arranged as a plurality of plan-parallel individual conductor traces through which a current flows. Scanning element 1 has an electronic circuit with electronic components 1.2, which are electrically connected to one another via layers E and F. The electronic circuit may also include an ASIC component, for example. This electronic circuit of scanning element 1 operates not only as an evaluation element but also as an excitation control element under whose control the excitation current which flows through excitation conductor traces 1.1111, 1.1131, 1.1151, 1.1211, 1.1231, 1.1251 is generated or produced. Excitation conductor traces 1.1111, 1.1131, 1.1151, 1.1211, 1.1231, 1.1251 are energized by one and the same excitation control element. First excitation track 1.111 and second excitation track 1.121 are electrically connected in series.

When excitation tracks 1.111, 1.113, 1.115, 1.121, 1.123, 1.125 are energized, an electromagnetic field oriented in the shape of a hose or cylinder is generated around excitation conductor traces tracks 1.111, 1.113, 1.115, 1.121, 1.123, 1.125. The field lines of the resulting electromagnetic field extend around excitation tracks 1.1111, 1.1131, 1.1151, 1.1211, 1.1231, 1.1251, the direction of the field lines depending on the current direction in excitation conductor traces 1.1111, 1.1131, 1.1151, 1.1211, 1.1231, 1.1251. In the area of conductive subregions 2.11, 2.21; 3.11, 3.21, eddy currents are induced so that a modulation of the field as a function of the angular position is achieved. Receiver tracks 1.112, 1.114, 1.122, 1.124 are therefore able to measure the relative angular position in each case. The pairs of receiver conductor traces 1.1121, 1.1141, 1.1221, 1.1241 are arranged within their receiver track 1.112, 1.114, 1.122, 1.124 such that they supply signals that have a 90° phase offset in phase in each case so that a determination of the direction of rotation is able to be performed as well. The signals generated by receiver tracks 1.112, 1.114, 1.122, 1.124 are further processed with the aid of a few of electronic components 1.2, which form an evaluation circuit.

Because of first shielding layer 1.13 and second shielding layer 1.14, a negative influence on the two detector units 1.11, 1.12 with regard to the measuring accuracy is able to be largely prevented. For example, an impermissibly high measure of crosstalk signals is prevented while excessive damping of the excitation fields is prevented at the same time. The electromagnetic interruption of detector units 1.11, 1.12 by electronic components 1.2 or from external sources is inhibited in addition.

What is claimed is:

1. A scanning element for an inductive position measuring device, comprising:
    a multi-layer circuit board including:
        a first detector unit including a first excitation track and a first receiver track, the first detector unit being arranged in a first layer and in a second layer of the circuit board;
        a second detector unit including a second excitation track and a second receiver track, the second detector unit being arranged in a third layer and a fourth layer of the circuit board;
    wherein the circuit board has a geometrical center plane located between the detector units;
    wherein the receiver tracks are arranged circumferentially about an axis in a circumferential direction;
    wherein the first receiver track includes first receiver conductor traces and the second receiver track includes second receiver conductor traces, the first receiver conductor traces and the second receiver conductor traces having a periodic characteristic;
    wherein the first receiver track has a first gap in the circumferential direction that is bounded by the first receiver conductor traces;
    wherein the second receiver track has a second gap in the circumferential direction that is bounded by the second receiver conductor traces; and
    wherein the circuit board includes a plated through-hole within the first gap and within the second gap.

2. The scanning element according to claim 1, further comprising electronic components arranged on the circuit board.

3. The scanning element according to claim 1, wherein the plated through-hole electrically connects the first detector unit to the third layer or the fourth layer or electrically connects the second detector unit to the first layer or the second layer.

4. The scanning element according to claim 2, wherein the plated through-hole is in electrical contact with at least one of the electronic components.

5. The scanning element according to claim 1, wherein the plated through-hole is arranged as a through-hole via.

6. The scanning element according to claim 1, wherein the first gap extends across a first length in the circumferential direction, and the first receiver conductor traces have a periodic characteristic having a first period length, the following relationship being satisfied:

$$L1 \geq \frac{1}{8} \cdot \lambda 1;$$

L1 representing the first length, λ1 representing the first period length.

7. The scanning element according to claim 1, wherein the second gap extends across a second length in the circumferential direction, and the second receiver conductor traces have a periodic characteristic having a second period length, the following relationship being satisfied:

$$L2 \geq \frac{1}{8} \cdot \lambda 2;$$

L2 representing the second length, λ2 representing the second period length.

8. The scanning element according to claim 6, wherein the second gap extends across a second length in the circumferential direction, and the second receiver conductor traces have a periodic characteristic having a second period length, the following relationship being satisfied:

$$L2 \geq \frac{1}{8} \cdot 2;$$

L2 representing the second length, λ2 representing the second period length.

9. The scanning element according to claim 1, wherein the first receiver conductor traces have a periodic characteristic having a first period length, and the second receiver conductor traces have a periodic characteristic having a second period length, the second period length being greater than or equal to the first period length.

10. The scanning element according to claim 2, wherein the second detector unit and at least one of the electronic components are arranged on a same side of the circuit board.

11. The scanning element according to claim 1, wherein the first detector unit includes a third receiver track, and the second detector unit includes a fourth receiver track.

12. The scanning element according to claim 11, wherein the third receiver track includes third receiver conductor traces having a periodic characteristic, a period length of the third receiver conductor traces being shorter than a first period length of the first receiver conductor traces.

13. The scanning element according to claim 11, wherein the fourth receiver track includes fourth receiver conductor traces having a periodic characteristic, a period length of the fourth receiver conductor traces being longer than a second period length of the second receiver conductor traces.

14. The scanning element according to claim 12, wherein the fourth receiver track includes fourth receiver conductor traces having a periodic characteristic, a period length of the fourth receiver conductor traces being longer than a second period length of the second receiver conductor traces.

15. The scanning element according to claim 1, wherein the first detector unit includes a third excitation track, and the second detector unit includes a fourth excitation track.

16. The scanning element according to claim 1, wherein a first shielding layer is arranged in a fifth layer, a second shielding layer is arranged in a sixth layer, and the plated through-hole penetrates the shielding layers.

17. The scanning element according to claim 1, wherein the plated through-hole electrically connects the first detector unit to the third layer and/or the fourth layer and/or electrically connects the second detector unit to the first layer and/or the second layer.

18. An inductive position measuring device, comprising:
a first scale element;
a second scale element; and
a scanning element having a multi-layer circuit board including:
   a first detector unit including a first excitation track and a first receiver track, the first detector unit being arranged in a first layer and in a second layer of the circuit board;
   a second detector unit including a second excitation track and a second receiver track, the second detector unit being arranged in a third layer and a fourth layer of the circuit board;

wherein the circuit board has a geometrical center plane located between the detector units;

wherein the receiver tracks are arranged circumferentially about an axis in a circumferential direction;

wherein the first receiver track includes first receiver conductor traces and the second receiver track includes second receiver conductor traces, the first receiver conductor traces and the second receiver conductor traces having a periodic characteristic;

wherein the first receiver track has a first gap in the circumferential direction that is bounded by the first receiver conductor traces;

wherein the second receiver track has a second gap in the circumferential direction that is bounded by the second receiver conductor traces;

wherein the circuit board includes a plated through-hole within the first gap and within the second gap; and, wherein the scale elements are arranged in a third direction that has an orthogonal orientation with respect to the center plane, at a distance on both sides of the circuit board.

19. The inductive position measuring device according to claim 18, wherein the first scale element has a first diameter, and the second scale element has a second diameter, the first diameter being greater than the second diameter.

* * * * *